United States Patent Office 3,266,990
Patented August 16, 1966

3,266,990
DERIVATIVES OF QUINAZOLINE
Wilson B. Lutz, North Manchester, Ind., and Robert I. Meltzer, Rockaway, N.J., assignors to Warner-Lambert Pharmaceutical Company, Morris Plains, N.J., a corporation of Delaware
No Drawing. Filed Sept. 24, 1963, Ser. No. 311,209
10 Claims. (Cl. 167—65)

This invention relates to new and novel substituted quinazolines of the formula:

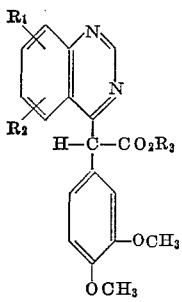

wherein $R_1$ and $R_2$ each represents hydrogen, lower alkyl or lower alkoxy and $R_3$ represents hydrogen, lower alkyl, aralkyl such as methylphenyl, ethylphenyl or dialkylaminoalkyl such as —$CH_2$—$CH_2$—$N(C_2H_5)_2$, for example, and to their nontoxic pharmaceutically acceptable acid addition salts. This invention also relates to a novel process for the production of these substituted quinazolines. The terms "lower alkyl" and "lower alkoxy" as used in the specification and in the claims refer to branched or straight chain aliphatic groups having 1 to 6 carbon atoms such as, for example, methyl, ethyl, propyl, butyl, t-butyl, amyl, methoxy, ethoxy, propoxy, butoxy and the like. Also, the symbols $R_1$, $R_2$ and $R_3$ used hereinafter have the same meaning as defined above.

The compounds of this invention exhibit significant pharmacological activity and are particularly useful in the treatment of ailments associated with the cardiovascular system, such as hypertension. In addition, they are valuable starting materials for the production of other substituted quinazolines.

Included within the scope of this invention are those substituted quinazolines such as 4-(3,4-dimethoxybenxyl)-6,7 - dimethoxyquinazoline, methyl α-(3,4 - dimethoxy phenyl) - 4 - quinazolineacetate, 4 - 3,4 - dimethoxybenxoyl)quinazoline, t - butyl α - (3,4 - dimethoxyphenyl) - 4 - quinazolineacetate, benzyl α - (3,4 - dimethoxyphenyl) - 4 - quinazolineacetate hydrochloride, 2 - dimethylaminoethyl α - (3,4 - dimethoxyphenyl) - 4-quinazolineacetate dihydrochloride, 4 - (3,4 - dimethoxybenzyl)quinazoline and 4 - (3,4 - dimethoxybenzyl)quinazoline hydrochloride.

It has been found that the novel compounds of this invention may be prepared by the following reaction sequence involving the several preparative procedures indicated.

Step I involves the preparation of the substituted quinazoline of the formula:

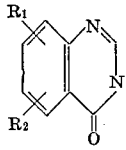

by reacting a substituted amide of the formula:

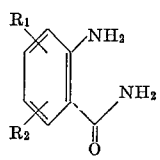

such as, for example, 6-aminoveratramide with formic acid. This ring closure reaction is readily effected by heating for about an hour at a temperature range of about 90° to 100° C.

Instead of employing the above-described amide as the starting material, it has also been found that amino acids of the formula:

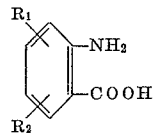

such as, for example, 6-aminoveratric acid may also be effectively employed. The ring closure reaction to obtain the desired substituted quinazolinone is effected by condensing with formamide. This reaction takes a longer period to complete, requiring about 20 to 24 hours and a temperature of about 100° to 120° C.

Step II involves the introduction of a halo substituent such as chloro into the 4-position of the compounds obtained in accordance with Step I. Halogenating agents such as thionyl chloride, phosphorous pentachloride or phosphorous oxychloride are particularly advantageous. The reaction may be exemplified by the equation:

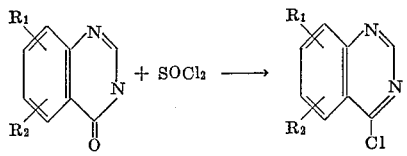

Generally, it has been found preferable to employ an excess of thionyl chloride. The reaction is preferably carried out in the presence of dimethylformamide. The reaction proceeds quite readily and is contemplated at about 120° C. in about 20 to 30 minutes.

Finally, the reaction products obtained in accordance with Step II are coupled with a substituted homoveratrate of the formula:

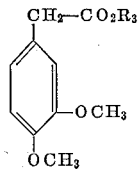

in the presence of sodium hydride or similar agents to obtain compounds of the formula:

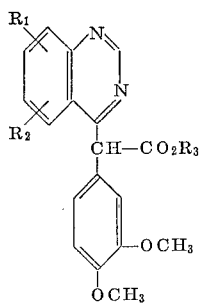

Compounds wherein $R_3$ is alkyl or aralkyl may be readily hydrolysed in a strong alkaline medium to obtain compounds of the formula:

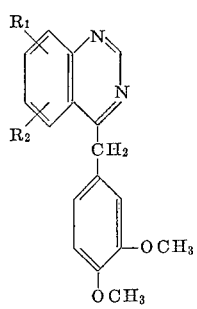

The novel compounds of this invention can form acid addition salts with acids. Such salts may be readily prepared by the usual methods, such as, for example, by the reaction of a stoichiometrically equivalent amount of the base with the desired acid employing a common and inert solvent. Examples of acids which are suitable for the preparation of acid addition salts of the amine base of this invention are inorganic acids such as, for example, hydrochloride, nitric, sulfuric, phosphoric and the like acids, and organic acids such as, for example, benzoic, acetic, salicyclic, maleic, tartaric, citric and the like acids. The preferred salts are those which are pharmaceutically acceptable, that is, they are acid addition salts which are no more toxic than the bases from which they are prepared and which possess the necessary physical properties to render them suitable for incorporation into dosage forms in combination with the desired pharmaceutical carriers.

For the therapeutic use, the compounds can be utlized in the form of the aqueous solutions of their acid addition salts, or the salts or bases can be combined with various inert pharmaceutical diluents or carriers into dosage forms such as, for example, tablets, capsules, elixirs, suspensions and the like.

For the treatment of hypertension, for example, a daily dose of about 1 to 100 mg. is usually satisfactory.

In order further to illustrate this invention but without being limited thereto, the following examples are given, all temperatures being given on the centigrade scale:

EXAMPLE 1

*Preparation of 6,7-dimethoxy-4-quinazolinone*

A. *From 6-aminoveratramide.*—A solution of 57.5 g. of 6-aminoveratramide in 200 ml. of 99% formic acid is heated on the steam bath for one hour. Most of the formic acid is then removed on a rotary evaporator. On addition of 500 ml. of water, 6,7-dimethoxy-4-quinazoline precipitates as a white solid which is filtered and washed with water and ethanol. The product after drying weighs 52 g. (86%) and melts at 295°–297°. Recrystallization from 800 ml. of dimethylformamide gives 35 g. of glistening platelets, M.P. 296°–298°.

B. *From 6-aminoveratric acid.*—A solution of 3.5 g. of 6-aminoveratric acid in 8 g. of formamide is heated to 110° for 24 hours. The solid which separates on cooling is filtered and washed with water and ethanol to give 1 g. (27%) of 6,7-dimethoxy-4-quinazolinone as tan crystals, M.P. 290°–292°. An analytical sample, M.P. 296°–298°, is obtained by recrystallization of the crude product from dimethylformamide.

EXAMPLE 2

*6,7-dimethoxy-4-chloroquinazoline*

A mixture of 3 g. of 6,7-dimethoxy-4-quinazoline, 25 ml. of thionyl chloride and 3 ml. of dimethylformamide is kept at reflux for 30 minutes. Excess thionyl chloride is then removed under reduced pressure and the last traces are chased with benzene. The residue is dissolved in 100 ml. of dichloromethane, the solution washed with 50 ml. of cold 20% potassium carbonate solution and dried over anhydrous potassium carbonate. The tacky white solid obtained by evaporation of the solvent is recrystallized from 40 ml. of dry benzene to give 2.9 g. of 6,7-dimethoxy-4-chloroquinazoline as white crystals which melt at 183°–185°. Analytical sample, recrystallized from benzene, melts at 183°–185°.

*Analysis.*—Calc. for $C_{10}H_9ClN_2O_2$: C, 53.46; H, 4.04; Cl, 15.75. Found: C, 53.41; H, 4.08; Cl, 16.00.

EXAMPLE 3

*4-chloroquinazoline*

4-chloroquinazoline is prepared from 4-quinazolinone in a way similar to Example 2 except that a reflux period of 2 hours is used. The crude product is sublimed to 86° (0.1 mm.) to give 91% of pale yellow sublimate melting at 95°–98°.

EXAMPLE 4

*Methyl-α-(3,4-dimethoxyphenyl)-4-quinazolineacetate*

To a mixture of 25 ml. of pyridine, 0.3 ml. of dimethylsulfoxide and 0.3 ml. of dimethylformamide (dried over sodium hydride) is added 5 g. (0.1 mol.) of 50% sodium hydride in mineral oil. 4-chloroquinazoline obtained in accordance with Example 3, 6.54 g. (0.04 mol) and methyl homoveratrate, 9.2 g. (0.044 mol) are added portionwise with stirring while the flask is warmed to 40°–50° with an oil bath. When the addition is about one-half complete, an exothermic reaction begins with vigorous evolution of hydrogen. This is moderated with an ice bath. After a total reaction period of 45 minutes, the olive colored mixture containing much suspended solid is cooled and stirred with ca. 200 ml. of dry ligroin, B.P. 90°–97°. The solid is filtered, dried and dispersed in 50 ml. of methanol containing 6 ml. of acetic acid. On addition of about 150 mg. of water, methyl-α-(3,4-dimethoxyphenyl)-4-quinazolineacetate precipitates as a yellow solid.

EXAMPLE 5

*t-Butyl-homoveratrate*

To a solution of 19.8 g. of homoveratric acid and 10 drops of concentrated sulfuric acid in 150 ml. of dichloromethane cooled to ca. −70° is added 75 ml. of liquid isobutene and the mixture kept for five days at room temperature. After venting the excess isobutene, the liquid residue is shaken with aqueous potassium hydroxide and the organic layer dried over potassium carbonate. Distillation of the solvent left 15.2 g. (61%) of t-butyl-homoveratrate as a crystalline residue, M.P. 71°–76°. Repeated recrystallization from hexane of similar material from another run followed by sublimation at 68° (0.03 mm.) gives an analytically pure sample, M.P. 76°–78°.

*Analysis.*—Calc. for $C_{14}H_{20}O_4$: C, 66.64; H, 7.99. Found: C, 66.50; H, 8.10.

EXAMPLE 6

*t-Butyl α-(3,4-dimethoxyphenyl)-4-quinazoline acetate*

To a solution of 31.8 mols of potassium amide in 70 ml. of liquid ammonia is added 4 g. (15.0 mols) of t-butyl homoveratrate obtained in accordance with Example 5 and the mixture stirred for ca. 30 minutes just below the boiling point of ammonia. The solution is cooled to ca. −70° and 1.84 g. (11.0 mols) of 4-chloroquinazoline added. The resulting dark red solution is stirred without external cooling for an additional 2 hours during which time the ammonia evaporates. Powdered Dry-Ice and methanol (50 ml.) are added to give a cream colored precipitate. Water (50 ml.) is added and the solid collected and washed with water. The moist filter cake is recrystallized to give t-butyl α-(3,4-dimethoxyphenyl)-4-quinazolineacetate in the form of white crystals, M.P. 116°–117°.

EXAMPLE 7

*4-(3,4-dimethoxybenzyl)quinazoline*

1 g. of methyl α-(3,4-dimethoxyphenyl)-4-quinazolineacetate in 30 ml. of methanol is heated to reflux and 1 ml. of 2 M potassium hydroxide is added to give an orange solution. Two additional 1 ml. portions of base are added after five and ten minute intervals. After 1 hour at reflux temperature, acetic acid (0.5 ml.) is added and most of the methanol removed by distillation. The solution is then made basic with aqueous potassium hydroxide and the crystalline solid collected and washed with water to give 0.84 g. of 4-(3,4-dimethoxybenzyl)quinazoline as white crystals, M.P. 162°–164°.

EXAMPLE 8

*4-(3,4-dimethoxybenzyl)quinazoline hydrochloride*

A solution of 2.35 g. of t-butyl α-(3,4-dimethoxyphenyl)-4-quinazolineacetate in 20 ml. of a 2 N solution of hydrogen chloride in 2-propanol is heated intermittently on a hot plate in an atmosphere of carbon dioxide during 2 hours. Carbon dioxide is evolved and the solution becomes yellow. On cooling, 0.80 g. of 4-(3,4-dimethoxybenzyl)quinazoline hydrochloride separates as a yellow solid. After two days at room temperature, an additional 0.21 g. of material separates. The combined products, dried over phosphorous pentoxide, is analytically pure, M.P. 85°–87°.

It is to be understood that the foregoing detailed description is given merely by way of illustration and that many variations may be made therein without departing from the spirit of our invention.

Having described our invention, what we desire to secure by Letters Patent is:

1. A compound of the formula:

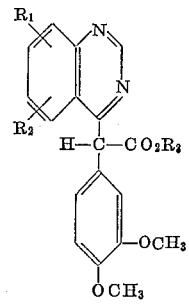

wherein $R_1$ and $R_2$ is each a member selected from the group consisting of hydrogen, lower alkyl and lower alkoxy and $R_3$ is a member selected from the group consisting of hydrogen, lower alkyl, phenyl lower alkyl and diethylaminoethyl and the nontoxic pharmaceutically acceptable acid addition salts thereof.

2. Methyl α-(3,4-dimethoxyphenyl)-4-quinazolineacetate.
3. 4-(3,4-dimethoxybenzoyl)quinazoline.
4. t-Butyl α - (3,4 - dimethoxyphenyl) - 4 - quinazolineacetate.
5. Benzyl α - (3,4 - dimethoxyphenyl) - 4 - quinazolineacetate hydrochloride.
6. 2 - diethylaminoethyl α - (3,4 - dimethoxyphenyl)-4-quinazolineacetate dihydrochloride.
7. 4-(3,4-dimethoxybenzyl)quinazoline.
8. 4-(3,4-dimethoxybenzyl)quinazoline hydrochloride.
9. 4-(3,-dimethoxybenzyl)-6,7-dimethoxyquinazoline.
10. A hypotensive composition comprising as active ingredient of about 1 to 100 mg. a compound selected from the group consisting of 4-(3,4-dimethoxybenzyl)-6,7-dimethoxyquinazoline and the pharmaceutically acceptable nontoxic acid addition salt thereof and a nontoxic inert pharmaceutical carrier.

References Cited by the Examiner
UNITED STATES PATENTS

| | | | |
|---|---|---|---|
| 2,758,996 | 8/1956 | Robinson | 260—251 |
| 2,986,573 | 5/1961 | Topliss et al. | 167—65 |
| 2,987,442 | 6/1961 | McLean et al. | 167—65 |
| 3,092,631 | 6/1963 | Song et al. | 260—251 |

NICHOLAS S. RIZZO, *Primary Examiner.*

JULIAN S. LEVITT, HENRY R. JILES, *Examiners.*

MARTIN J. COHEN, *Assistant Examiner.*